(12) United States Patent
Schmit et al.

(10) Patent No.: US 6,592,968 B1
(45) Date of Patent: Jul. 15, 2003

(54) COMPOSITE SHEET INTENDED FOR DRAWING, COMPRISING A MAIN SHEET AND AT LEAST ONE ADHESIVELY BONDED PATCHING SHEET BLANK AS A PATCH

(75) Inventors: Francis Schmit, Ansacq (FR); Michel Sanadres, Pont Saint Maxence (FR); Philippe Charbonnet, Senlis (FR)

(73) Assignee: Usinor, Puteaux (FR)

( * ) Notice: Subject to any disclaimer, the term of this patent is extended or adjusted under 35 U.S.C. 154(b) by 0 days.

(21) Appl. No.: 09/695,862

(22) Filed: Oct. 26, 2000

(30) Foreign Application Priority Data

Oct. 26, 1999 (FR) .............................. 99 13326

(51) Int. Cl.$^7$ ................................ B32B 3/00
(52) U.S. Cl. ........................... 428/172; 428/63
(58) Field of Search ................ 428/174, 63, 354, 428/77, 78, 172, 542.8; 156/60, 196, 292

(56) References Cited

U.S. PATENT DOCUMENTS

| | | | |
|---|---|---|---|
| 3,971,688 A | | 7/1976 | Abbott |
| 4,343,851 A | * | 8/1982 | Sheptak ..................... 428/212 |
| 4,374,890 A | | 2/1983 | Shimizu et al. |
| 4,528,230 A | * | 7/1985 | Larson ..................... 428/137 |
| 4,690,856 A | * | 9/1987 | Ito et al. ..................... 428/215 |
| 4,727,232 A | | 2/1988 | Omori et al. |

FOREIGN PATENT DOCUMENTS

| | | |
|---|---|---|
| DE | 1 527 957 | 11/1971 |
| DE | 19621944 A1 | 5/1997 |
| EP | 0 953 495 A2 | 11/1999 |
| GB | 2 157 409 A | 9/1987 |
| WO | WO 92/11162 | 7/1992 |

* cited by examiner

*Primary Examiner*—Donald J. Loney
(74) *Attorney, Agent, or Firm*—Young & Thompson (57) ABSTRACT

The adhesive bonding system is chosen, applied and, where appropriate, crosslinked so as to have a critical energy release rate in mode I (tension) greater than 1500 J/m$^2$ and a critical energy release rate in mode II (shear) greater than 2000 J/m$^2$. The composite sheet is easily drawable to form parts requiring no curing after forming.

18 Claims, 4 Drawing Sheets

COMPOSITE SHEET INTENDED FOR DRAWING, COMPRISING A MAIN SHEET AND AT LEAST ONE ADHESIVELY BONDED PATCHING SHEET BLANK AS A PATCH

FIELD OF THE INVENTION

The invention relates to a composite sheet having local thickness variations generally obtained by localized adhesive bonding of reinforcement sheet blanks or "patches" to a main sheet of uniform thickness; such a composite sheet is often called a "patchwork sheet".

This type of composite sheet makes it possible to lighten motor-vehicle structures since only the regions most stressed are provided with adhesively bonded reinforcement blanks, that is to say the regions are "patched"; the composite sheet then has the smaller thickness in the unreinforced regions and the larger thickness in the reinforced regions.

These composite sheets must be able to be drawn, like conventional sheets of uniform thickness, so as, in particular, to produce motor-vehicle structural or body parts; the major problem is then the ability of the adhesive joints, which join the "patches" to the sheet, to withstand the stresses and strains applied during the drawing operation.

BACKGROUND OF THE INVENTION

Documents DE, 4,307,563 (BMW) and DE 19,524,235 (VW) describe composite sheets of this type, comprising a main sheet locally reinforced by adhesively bonded patches in the regions to be reinforced. The patches may have different thicknesses and mechanical properties, tailored to the reinforcement requirements specific to each region to be reinforced.

Adhesives envisaged for producing this type of sheet are, for example, of the epoxy type; unfortunately, as the results presented below confirm, the composite sheets obtained are unable to withstand drawing operations well, especially because:

the adhesive joints are not generally strong enough to withstand the deformation stresses applied during the forming operation;

the adhesive joints are generally not ductile enough to deform with the sheet elements during the forming operation.

To avoid these drawbacks, DE 4,307,563 and EP 823,297 describe a process for manufacturing formed parts made of composite sheet of this type, such as motor-vehicle body parts, in which:

before the forming, the consolidation of the various sheet elements of the composite sheet is only partial (the "tacky" effect of the adhesive is used) so that the adhesive joint between these elements can undergo, without damage, the deformations applied during the forming operation;

after the forming, the consolidation of the various elements of the composite sheet is reinforced by crosslinking the adhesive joints, which no longer have to undergo deformation.

This process exhibits certain drawbacks:

it is limited to bonding systems based on a crosslinkable adhesive, thereby excluding thermoplastic adhesives;

before forming, the composite sheet must be handled with care, in order to prevent any risk of changing the position of the "patches";

after forming, it is necessary to add a curing step which is economically penalizing.

SUMMARY OF THE INVENTION

The object of the invention is to avoid the aforementioned drawbacks by providing a system for adhesively bonding the elements of the composite sheet which, although completely activated before the forming, possesses the intrinsic mechanical properties required so as not to be degraded during a drawing-type forming operation.

For this purpose, the subject of the invention is a composite sheet intended for drawing, comprising at least one main sheet and at least one patching sheet blank adhesively bonded as a patch to a region of the said main sheet to be reinforced by means of a bonding system, characterized in that the said bonding system is chosen, applied and, where appropriate, crosslinked so as to satisfy the following intrinsic criteria within the temperature range of the drawing operation to which it is intended:

a critical energy release rate in mode I (tension) greater than 1500 J/m$^2$;

a critical energy release rate in mode II (shear) greater than 2000 J/m$^2$.

The statement whereby the said bonding system is, where appropriate, crosslinked means that if this bonding system comprises crosslinkable components, the system for bonding the composite sheet is actually crosslinked.

The said temperature range corresponds to the temperature that the composite sheet reaches during the drawing operation for which it is intended, more specifically to the temperature of the bonding system for this sheet; under standard conditions, this temperature range generally corresponds to the 15° C.–40° C. interval; the critical energy release criteria are therefore considered in this range.

The invention may also exhibit one or more of the following features;

the said bonding system is chosen so as to furthermore satisfy the following relative criterion: an elongation at break greater than that of the metal of the said main sheet and greater than that of the metal of the said patch blank, preferably by more than 40%;

the said bonding system comprises one or more thermoplastic and/or thermosetting and/or elastomeric resins, which may or may not be linked by physical and/or chemical bonds;

the thickness of the said bonding system is between 0.05 and 5 mm;

the said bonding system comprises a polymer material chosen from the group comprising polyolefins and polyvinyl chlorides;

the said bonding system comprises a polyolefin polymer material characterized by a melting point of greater than 120° C.;

the said bonding system comprises a polyolefin polymer material characterized by a melting point of greater than 160° C.;

the said bonding system comprises a core made of a polymer material and two thin layers of adhesive, one being inserted between the said main sheet and one face of the core, the other being inserted between the said patching sheet and the other face of the core; preferably, the thickness of each of the said thin layers is then between 5 and 50 μm.

The subject of the invention is also a process for manufacturing a formed part using a composite sheet previously described, characterized in that it comprises the steps in which:

the said main sheet and at least one patching blank are prepared;

then, by inserting the bonding system, the said patching blank is applied to that region of the said main sheet to be reinforced;

then, where appropriate, the said bonding system is crosslinked so as to obtain the said composite sheet; and then the said composite sheet obtained is formed by drawing.

The statement according to which "the said bonding system is, where appropriate, crosslinked" means that if this bonding system comprises crosslinkable components, the bonding system for the composite sheet is actually crosslinked before the forming.

Thus, formed parts are obtained which are effectively reinforced without having to necessarily employ a curing step after forming.

BRIEF DESCRIPTION OF THE DRAWINGS

The invention will be more clearly understood on reading the description which follows, given by way of non-limiting example and with reference to the appended figures in which:

FIGS. 5 to 7 relate to the method of measuring the rate $G_{Ic}$, of a bonding system.

FIGS. 8 and 9 relate to the method of measuring the rate $G_{IIc}$ of a bonding system.

FIGS. 10 and 11 relate to the method of evaluating the drawability of a bonding system.

DETAILED DESCRIPTION OF THE INVENTION

Figures 1, 2:
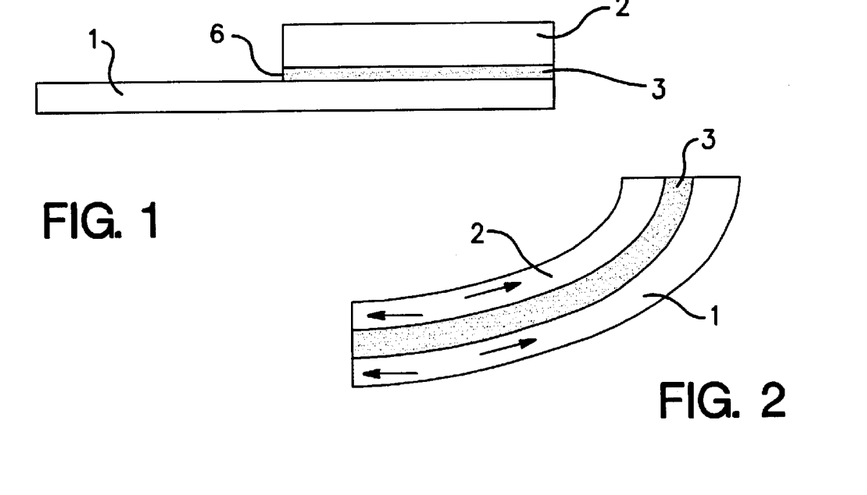
FIG. 1 shows a composite sheet according to the invention.
FIG. 2 shows a reinforced region of this sheet after deformation.

FIG. 1 shows a composite sheet comprising a main metal sheet 1 and a reinforcement or patch sheet blank 2 adhesively bonded to the main sheet 1 by means of the bonding system 3.

The bonding system 3 used for joining together the elements of the composite sheet must have, according to the invention, intrinsic properties relating to the following points:

the bonding system must have a sufficient level of adhesion with respect to the surface of the sheets used so as to prevent delamination phenomena at the "sheet/adhesive" interfaces due to the effect of the large plastic deformations of the steel during drawing;

the bonding system must have a sufficient intrinsic ductility to be able to follow, without deterioration, the plastic deformations of the steel in the regions provided with patches, as shown in FIG. 2; it must thus undergo a level of tensile deformation of the same order of magnitude as that of the elements of the composite sheet;

finally, it is paramount that the bonding system be suitable for transferring, during the drawing operation, the deformation stresses from one element of the composite sheet to another, especially at the geometrical singularities of the composite sheets; the geometrical singularities relate to the regions of thickness variation, the border regions of the "patches" and/or the boundary regions of the adhesively bonded joints; some of these singularities can be likened to crack initiators; at these singularities, the stresses to be transferred are both in peel mode (or tensile mode, called mode I) and in shear mode (or mode II); in order for a bonding system at these singularities to strongly withstand delamination in peel mode (mode I) and in shear mode (mode II), it must have a high toughness.

Figure 3:
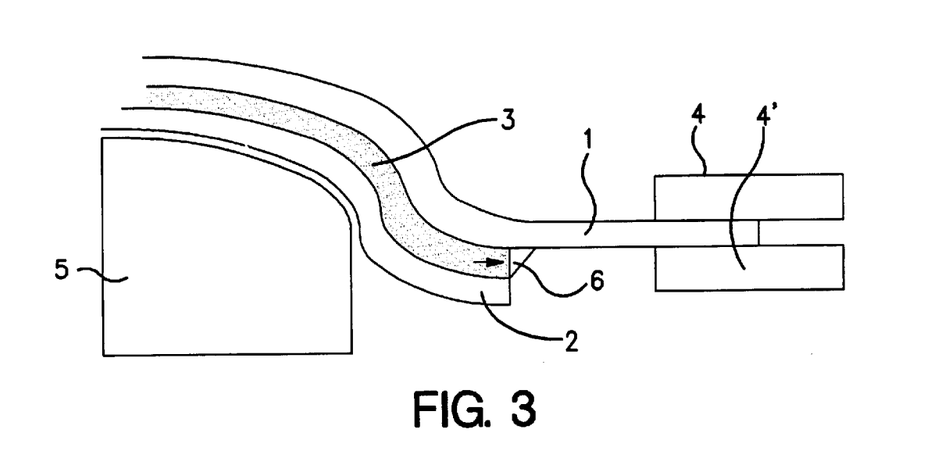
FIGS. 3 and 4 show a composite sheet during deformation in a drawing machine.
Figure 4:
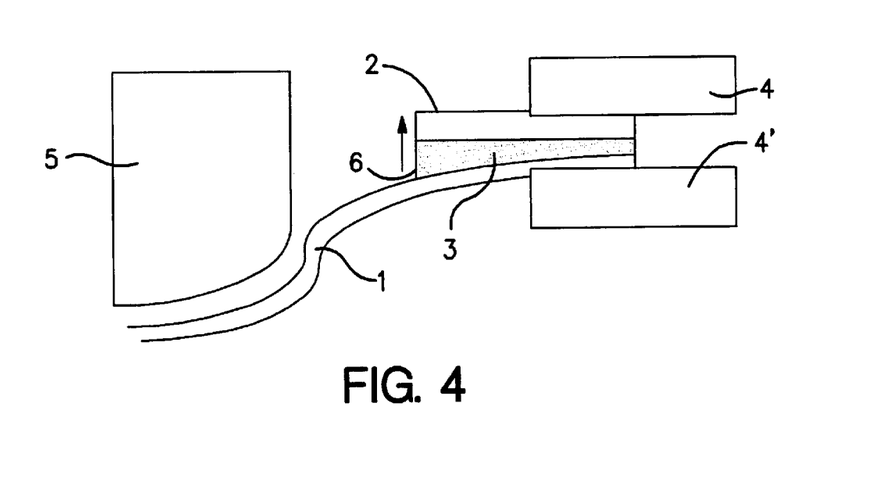

FIGS. 3 and 4 show a composite sheet during deformation in a drawing machine which has two blank-holder jaws 4, 4' and a punch 5; the singularity region 6 corresponds to the boundary of the patch 2 and to that of the adhesive joint 3; referring to FIG. 4, it may be seen that this region 6 is subjected to peel stresses (mode I; see arrow) causing a separation between the patch 2 and the main metal sheet 1 in this area (see FIG. 4); referring to FIG. 3, it may be seen that this region 6 is subjected to shear stresses (mode II; see arrows) causing the slanting shape of the boundary of the adhesive joint in the region 6 (see FIG. 3).

The level of adhesion is a conventional criterion for defining a bonding system relative to the surface to which it must adhere; this criterion is not intrinsic since the surface to which it has to adhere affects the level of adhesion; the intrinsic ductility is another criterion conventionally used to define bonding systems for composite sheets capable of being drawn.

The criteria relating to the transfer of the stresses without failure in the area of the singularity regions of the composite sheet are the basis of the contribution to the state of the art by the invention; according to the invention, it will be considered that a failure in this area occurs by the appearance and propagation of a crack in the bonding system; a method will then be proposed for quantifying the mechanical behaviour of the bonding system in this area and for determining criteria that the bonding system must meet in order for the composite sheets produced on the basis of this system to be capable of being drawn without deterioration; next, the relevance of these criteria will be experimentally verified by drawing trials on composite sheets using very different bonding systems.

To quantify the criteria regarding the resistance of the bonding system to stress in the area of the singularity regions, it is therefore proposed to use the following quantities:

the critical energy release rate in mode I, denoted $G_{Ic}$: this quantity characterizes the resistance to cracking of an adhesively bonded joint undergoing a localized opening load, that is to say a tensile load perpendicular to the joint plane;

the critical energy release rate in mode II, denoted $G_{IIc}$: this quantity characterizes the resistance to cracking of the adhesively bonded joint undergoing a shear load, that is to say a force parallel to the plane of the adhesively bonded joint.

It has been found, according to the invention, that the bonding systems which satisfy both the conventional criteria relating to adhesion and ductility, but also these novel criteria relating to the intrinsic values of the critical energy release rates in mode I and mode II of the bonding system, make it possible to obtain locally "patched" composite sheets fully capable of being drawn, without any risk of deterioration of the adhesive joints between the patches and the main sheet.

Thus, it has been found that very different bonding systems make it possible to obtain composite sheets capable of being drawn as long as they satisfy, apart from the conventional criteria, the following novel quantitative criteria:

$G_{Ic} > 1500$ J/m$^2$;

$G_{IIc} > 2000$ J/m$^2$.

Adhesion and drawing trials carried out on very different composite sheets have given conclusive results as long as the bonding system meets these criteria and has an elongation at break greater than that of the metal of these sheets.

Various alternative forms of composite sheets according to the invention, exhibiting local thickness variations obtained by localized bonding of reinforcement sheet blanks or "patches" on a main sheet of uniform thickness, will now be described.

Thereafter, various ways of manufacturing such sheets will be described.

The composite sheets according to the invention therefore comprise:

various metal elements: main sheet and patches;

a bonding system for consolidating the patches with the main sheet.

In the case of the metal elements, all types of metal sheets may be employed (for example steel, aluminium or copper sheets); in the case of steel sheets, these may be bare (oiled or clean), coated with a metal alloy (and oiled or clean), treated with a mineral compound (for example of the phosphatizing type) and which are oiled or not, or are coated with an organic material (for example, a primer, a finishing lacquer or a thin organic coating); in the case of an organic coating, this may contain metal fillers so that the sheet remains weldable.

With regard to the bonding system, any polymer material or polymer complex can be used as long as it results in a bonding system meeting the criteria specific to the invention; in particular:

it may comprise one or more thermoplastic and/or thermosetting and/or elastomeric resins which may or may not be linked by physical and/or chemical bonds;

it may comprise a thermoplastic resin (for example, of the thermoplastic polyester-melamine type or of the polyethylene type) dissolved in a thermosetting resin (for example of the epoxy or polyester-melamine type).

Preferably, so as to meet these criteria, at least one polymer is chosen from the group comprising polyolefins and polyvinyl chlorides. In view of the intended applications relating mainly to the motor-vehicle sector, it is recommended to use at least one polyolefin polymer characterized by a melting point greater than 120° C. This characteristic must make it possible to meet the requirements of in-service withstand capability for the intended applications which are liable to vary within environments possibly reaching temperatures of 100° C. For the applications requiring good compatibility of the composite sheets with respect to the heating cycles of the painting operations in assembly lines of motor-vehicle manufacturers, the choice falls more specifically on polyolefin polymers characterized by a melting point greater than 160° C.

The polymer material or polymer complex used to form the bonding system for the composite sheets according to the invention may also include additives such as chemical and/or metal and/or mineral compounds:

metal compounds, such as zinc, nickel or iron phosphate fillers, so as, in particular, to ensure electrical conductivity between the main metal sheet and each of the reinforcement sheets of the composite sheet and thus to favour, in the reinforced regions of the composite sheet, the spot-welding operations and the painting operations carried out after the drawing operations;

mineral compounds, such as talc, chalk, lime and silica fillers so as, in particular, to adjust the viscosity of the polymer when the latter is present in a solvent or pasty form and so as to facilitate the application of the polymer material when producing the bonding system; these mineral compounds may also be used to improve the temperature withstand capability of the bonding system during the painting operations that may follow the drawing operations;

chemical compounds, such as compounds based on maleic anhydride, silanes and acrylic acids, so as, in particular, to obtain direct adhesion of the polymer material (or polymer complex) to the surfaces to be coated with adhesive due to the effect of the curing cycle applied before the drawing operations; the addition of chemical compounds, such as elastomeric fillers, may also serve to obtain a bonding system meeting the ductility and toughness criteria specific to the invention.

These additives are conventionally introduced into the polymer material for application of the first curing cycle which allows the bonding system to achieve the performance meeting all the criteria specific to the invention; after the bonding system has been produced and cured, the bonds between its various components and the resin of the polymer may vary in number, vary in strength and be of different type (physical bonds and/or chemical bonds).

The bonding system for the composite sheet according to the invention may also have any thickness as long as, overall, the bonding system meets the criteria specific to the invention; this thickness is conventionally between 5 $\mu$m and 5 mm; preferably, this thickness is between 50 $\mu$m and 1 mm.

According to one embodiment, the bonding system comprises a core made of polymer material.

In order in particular to make it easier to manufacture the bonding system, a thin layer of adhesive is then preferably applied to both faces of the core and/or to the surfaces of the main sheet and of the patches which are to be adhesively bonded; this thin layer of adhesive is intended to provide the bond between, on the one hand, the surface of the patch and, on the other hand, the surface of the main sheet; it avoids having to add specific adhesion agents into the polymer material (such as certain organic compounds, mentioned above).

The core is generally in the form of a solid film.

The thickness of the thin layer of adhesive is substantially less than the thickness of the core (after application of the curing cycle) while still generally remaining greater than 1 $\mu$m; this thickness is generally between 5 and 50 $\mu$m.

It does not matter whether the thin layer of adhesive is applied to both surfaces of the polymer material or to those faces of the sheets which are intended to be adhesively bonded, in all cases before the bonding system has been completed.

In order to deposit the adhesive on the steel sheets, conventional application processes are used such as, for example, spraying, application by roll coating, application using a spatula or application by screen printing. In the case of sheets used for producing the main blanks, the choice of application process is preferably aimed at a localized application of the layer of adhesive in the regions to be adhesively bonded. However, for ease of implementation, this thin layer may be applied over the entire surface of the sheet of the main blank; in this case, metal fillers (such as iron phosphide or zinc fillers) may be introduced into the adhesive in order to facilitate the subsequent welding operations for joining together the parts produced from this composite sheet.

To deposit the adhesive on both surfaces of the polymer material, it is preferred to use coextrusion processes (the coextrusion of two layers of adhesive on both faces of the polymer material). Other processes, such as spraying, application by roll coating, application using a spatula and application by screen printing, may also be employed.

To manufacture the composite sheets according to the invention, conventional processes are used.

Thus, the choice of the method of producing and applying the bonding system depends both on economic and technical parameters, in which, for example, the form of the polymer material used (liquid, pasty, or solid, for example in film form) and the final intended thickness of the bonding system are involved.

Likewise, the curing conditions needed to obtain the performance of the bonding system depend on the polymer materials (or polymer complexes) used. By way of example, the curing may be carried out by prolonged storage at room temperature and/or by heating.

When manufacturing the composite sheets, it is also possible to supplement the bonding system with other consolidating means, such as by welding or by mechanical assembly (for example, screws or rivets); in the case of spot welding, this should be done before the application of the first curing cycle. These consolidating means then also serve to ensure electrical conductivity between the various elements of the composite sheet and, where appropriate, to maintain sufficient consolidating between the elements of the composite sheet before the curing cycle.

By virtue of the bonding systems defined by the invention, composite sheets are obtained which withstand the drawing operations; no curing operation after forming is needed.

The following non-limiting examples illustrate the invention:

MATERIALS

A test piece is a specimen of composite sheet, suitable for carrying out the characterization trials (see §METHODS below); it corresponds to two sheet blanks adhesively bonded, at least over part of their surface.

The sheets used for preparing the test pieces of composite sheet are steel sheets:

for the trials intended for evaluating $G_{Ic}$ and $G_{IIc}$ (§1 and §2 below): bare steel sheet having a high yield stress ($R_e$>700 Mpa) with a thickness of 4 mm;

for the trials intended for evaluating the level of adhesion, the ductility and the drawability (§3 and §4 below), various galvanized steel sheets having a thickness of 0.8 mm are used (cf. below for details).

For certain test pieces, identical sheets are used, but these are precoated with adhesive or prepainted according to the characteristics described below.

The bonding systems used comprise at least one layer of adhesive for bonding the two sheet blanks.

Certain systems furthermore include a core made of a polymer material inserted between the two sheet blanks; in this case, the system comprises two layers of bonding adhesive, each between one of the sheet blanks and the core.

The method for preparing the test pieces depends on the bonding system used (cf. below); in general, it comprises the following steps:

cutting the main blank and the patches made of steel sheets;

where appropriate, cutting the core parts of the bonding system;

where appropriate, treating the surface of the core parts in order to improve their bondability;

cleaning the main steel blank and the steel patch, by immersing them twice for ten minutes in an ultrasonically stirred ethyl acetate bath;

coating the clean faces of the patch and of the main blank with adhesive, at least in the areas that it is desired to reinforce; applying the adhesive using a spatula; deposited thickness set at 25 µm using a doctor blade and shims;

where appropriate, depositing the core parts on the adhesively coated part of the main blank;

placing the patch on the adhesively coated part of the main blank or, where appropriate, on the various core parts;

if the adhesive used is a thermosetting adhesive, heat treating the composite sheet under conditions suitable for curing the adhesive; in general, a heating press is used for this purpose, the pressure applied corresponding to the contacting pressure;

natural cooling to room temperature and holding for at least 24 hours before use.

The bonding systems used are the following:

Bonding System 1 Based on a One-component Epoxy Adhesive:

This adhesive is manufactured by SAIM under the reference 7980B; it is in a pasty form and mainly consists of a DGEBA (diglycidyl ether of bisphenol A) resin and of a dicydiamine hardener; it is used in the motor-vehicle industry for structural-bonding and welding-bonding applications.

The crosslinking heat treatment after contacting comprises a temperature hold of 30 minutes at 180° C.

Bonding System 2 Produced From a 0.2 mm Thick Polystyrene Core and a Two-component Polyurethane Adhesive.

The sheets from which the main blank and the patch are cut are therefore in this case prepainted SOLPRIME C™ sheets comprising, on both faces, an approximately 18 µm thick coat of a paint whose binder is based on approximately 75% polyester-isocyanate and approximately 25% epoxy-phenolic.

The mechanical properties of this bonding system (ductility and toughness levels in modes I and II) depend mainly on the polystyrene core; the polyurethane adhesive serves mainly to ensure the desired level of adhesion between this polystyrene core and the steel sheets; deposited with a very small thickness (less than 25 µm) on the surface of each sheet, this adhesive does not have a major effect on the macroscopic mechanical properties of the bonding system.

Details About the Method of Preparing the Test Pieces:

surface treatment of the polystyrene parts:

precleaning of the parts with methanol or isopropanol;

immersion of the parts for 3 to 4 minutes in a solution heated to a temperature of between 100 and 105° C. and consisting of 90 parts by weight of concentrated sulphuric acid and 10 parts by weight of sodium dichromate;

rinsing with distilled water;
hot-air drying (temperature<50° C.);
Heat treatment for curing the adhesive:
heating hold temperature: between 60° C. and 80° C.;
heating hold time: between 30 and 120 minutes.

Bonding System 3 Produced From a 0.2 mm Thick Core of Polymethyl Methacrylate (PMMA) and a Two-component Methacrylate Adhesive.

As in the case of the bonding system 2, the mechanical properties of this bonding system (ductility and toughness levels in modes I and II) are mainly conferred by the PMMA core; the methacrylate adhesive is deposited with a very small thickness (less than 25 µm) on the surface of each sheet.

Details About the Method of Preparing the Test Pieces:
surface treatment of the polymethyl methacrylate parts:
precleaning of the parts with isopropanol or methyl ethyl ketone (wiping or immersion);
abrasion using glasspapers (180–400);
final cleaning of the parts with isopropanol or methyl ethyl ketone (wiping);
Heat treatment for curing the adhesive:
heating hold temperature: between 60° C. and 80° C.;
heating hold time: between 15 and 60 minutes.

Bonding System 4 Produced From Sheets Precoated With Adhesive and From a 0.2 mm Thick Polypropylene Core:

The sheets from which the main blank and the patch are cut are therefore in this case sheets precoated with adhesive, comprising, on one face, an approximately 15 µm thick layer of an adhesive having epoxy radicals and grafted polypropylene.

Details About the Method of Preparing the Test Pieces:
no cleaning or adhesive coating of the main blank or of the patch, since they are precoated with adhesive;
heat treatment for curing the adhesive:
heating hold temperature: between 200° C. and 250° C.;
heating hold time: long enough to allow softening of the polypropylene core and good wetting of the sheet precoated with adhesive (about 40 seconds).

Bonding System 5 Produced From a 0.2 mm Thick Polyethylene Core and a Nitrile-phenolic Adhesive.

Here too, the mechanical properties of this bonding system are mainly conferred by the polyethylene core.

Details About the Method of Preparing the Test Pieces:
surface treatment of the polyethylene parts: passage through an oxidizing flame;
coating the main blank and the patch with adhesive:
application using a bar coater; thickness deposited per face less than 25 µm; drying of the adhesive-coated faces in the open air for 10 minutes before depositing the thermoplastic core parts.
heat treatment for curing the adhesive:
heating hold temperature: between 100° C. and 120° C.;
heating hold time: between 40 and 120 minutes.

Bonding System 6 Based on an Epoxy/mesh Film:

This adhesive is manufactured by Narmco under the reference MELTBOND™ 1113; it is widely used by aeronautical manufacturers for structural-bonding applications.

This bonding system is in the form of a film consisting of a mesh coated with an adhesive of the modified epoxy type; the overall thickness of the film is approximately 0.2 mm; this epoxy adhesive mainly comprises a resin of the DGRE (diglycidyl resorcinol ether) type and a polyamine hardener; the adhesive also contains a plasticizer of the CTBN (carboxyl terminated butadiene nitrile) type.

The crosslinking heat treatment after contacting involves a heating cycle comprising a temperature hold of 20 minutes at 143° C.

Bonding System 7 Produced From Sheets Precoated With Adhesive and From a 0.2 mm Thick PVC (Polyvinyl Chloride) Core:

The sheets from which the main blank and the patch are cut are therefore in this case sheets precoated with adhesive comprising, on one face, a layer about 10 µm in thickness of a polyester-based adhesive.

Details About the Method of Preparing the Test Pieces:
no cleaning or adhesive coating of the main blank or of the patch, since they are precoated with adhesive;
heat treatment for curing the adhesive:
heating hold temperature: between 170° C. and 220° C.;
heating hold time: long enough to allow softening of the PVC core and good wetting of the sheet precoated with adhesive (between 10 and 30 seconds).

Test pieces of composite sheets differing in their bonding system and labelled 1 to 7 are obtained.

METHODS

1) Description of the Method Used for Evaluating the Critical Energy Release Rate in Mode I, Denoted $G_{Ic}$, of a Bonding System From Opening Tests on a DCB Test Piece in Mode I (Tension):

DCB is the abbreviation of "Double Cantilever Beam".

1.1/Principle of the Test:

The test employed consists in making a crack propagate within an adhesively bonded joint stressed in tension and in measuring the resistance of this joint to the propagation of this crack.

Figure 5:
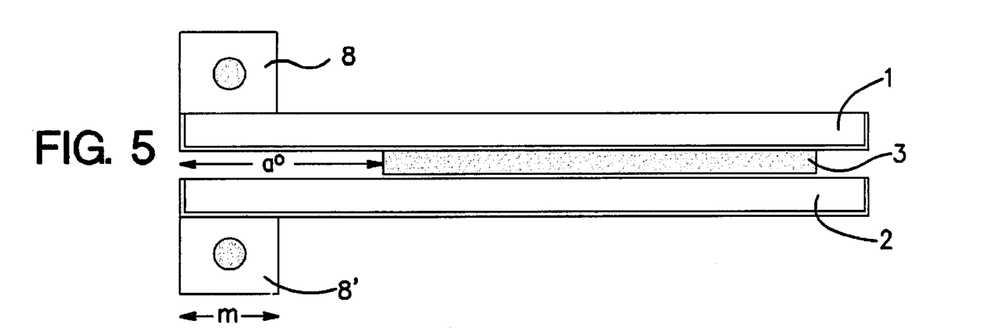
FIGS. 5 and 6 show the test piece to be tested and the set-up which are used.

1.2/Geometry and Dimensions of the Test Pieces for the Tests:

A DCB test piece of a composite sheet is prepared by adhesively bonding two identical sheet blanks; sheets of steel having a high yield stress (greater than 700 Mpa) and a thickness of 4 mm are used; the thickness of the adhesively bonded joint to be tested is set using TEFLON™ shims; the test piece obtained is shown in FIG. 5: length 210 mm, width 25 mm; total thickness h is therefore greater than 8 mm.

An initial crack of length $a_o$=70 mm was intentionally made within the adhesively bonded joint tested, so as to facilitate the initiation of the cracking during the application of tensile stress; the thickness of this crack corresponds to that of the adhesively bonded joint; this crack is created at the time of preparation of the test piece by placing a TEFLON™ shim within the adhesively bonded joint.

Anchoring heads 8, 8' allow the test piece to be fastened to the tensioning device responsible for imposing the opening loads; the length m of the anchoring heads is 30 mm; each of the heads 8, 8' is pierced at its centre by a 15 mm diameter pin; these anchoring heads are fastened by screwing to one of the ends of each blank of the test piece.

The use of steel sheets having a high yield stress (>700 Mpa) and large thickness ($\geq$4 mm) should prevent these sheets from plastically deforming during the test, while limiting the overall deformation of the test piece to the region of linear behaviour.

These conditions allow the critical energy release rate $G_{Ic}$ of the bonding system to be calculated using the linear theories of fracture mechanics, the main elements of which are reviewed below:

1.3/Execution of a Tensile Test Between the Two Anchoring Heads:

The curve giving the change in load P (in kN) as a function of the displacement D (in mm) of the crossbeam of the tensile testing machine, that is to say of the separation of the two heads 8, 8', is recorded.

In practice, after the test piece has been fastened to the tensile testing machine, it is pulled at a constant rate (equal to 2 mm/min.) until the crack has propagated over an additional length of 5 to 10 mm (this propagation is measured on one of the two sides of the test piece); as soon as this propagation starts, the measured load P decreases, although the direction of movement of the crossbeam of the tensile testing machine has not been changed.

After having made the crack propagate over the desired length, the test piece is unloaded by reversing the direction of movement of the crossbeam (negative movement direction), this having the effect of stopping the propagation of the crack; this unloading must be taken down to a sufficiently low value of the load, for example equal to ⅓ of the maximum force measured at the previous point at which the crack propagation was stopped, that is to say just before the start of the unloading.

After having carried out the unloading down to this "low" value, the test piece is reloaded by again reversing the direction of movement of the crossbeam (positive movement direction) until propagation of the crack resumes, over an additional length of 5 to 10 mm, before repeating the unloading operation described above.

Figure 7:
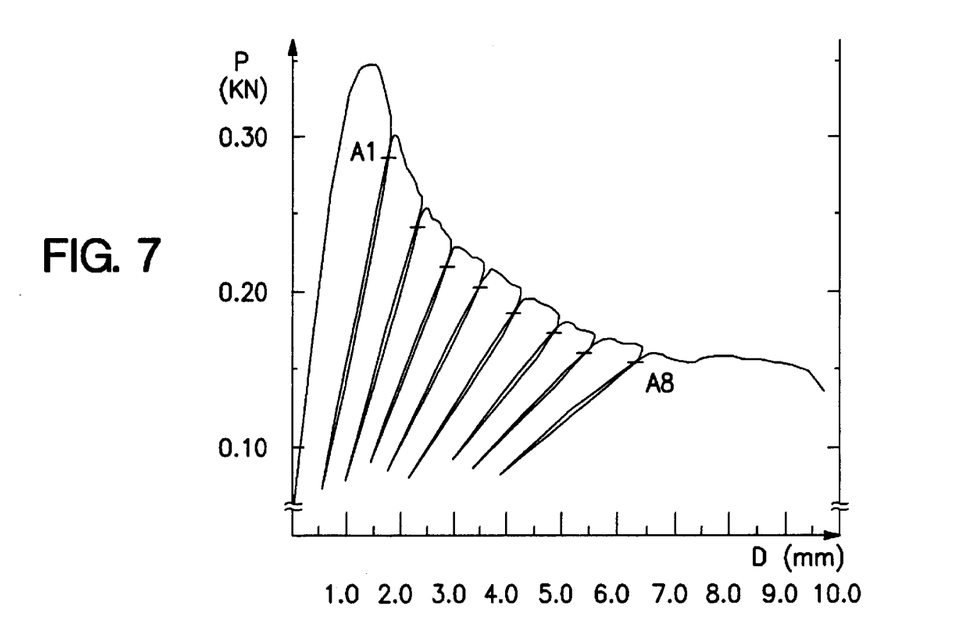
FIG. 7 illustrates the type of results obtained: load P (scale: 0.1–0.2–0.3 kN) as a function of the vertical displacement D (scale: 1 to 10 mm)

In order for the test to be properly conducted, six to eight series of "unloadings-loadings" are carried out per test piece; a curve of the type in FIG. 7 is then obtained.

1.4/Exploitation of the Results:

A so-called theoretical calculation method is used.

The theoretical expression for the critical energy release rate $G_{Ic}$ is given by the equation (1):

$$G_{Ic}=(P^2/(2b))(dC/da) \quad (1)$$

where P: applied load b: width of the test piece dC/da: derivative of the compliance with respect to the crack length, where the compliance C denotes the ratio of the displacement D to the load P.

Figure 6:
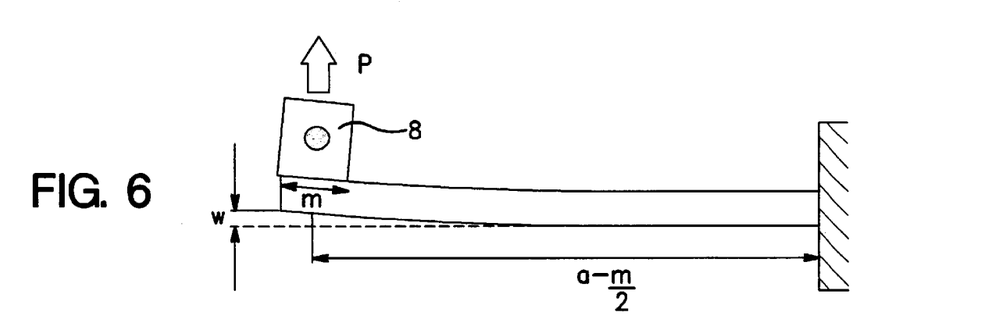

The "theoretical" method used is based on the theory of beams: each half of the test piece can be likened to a beam restrained at the front of the crack, as shown in FIG. 6 where the "imaginary" restraining region is shown by the cross-hatched region; at the tip of the crack, the displacement D (in the direction of the tensile force) and the deviation (in the crack propagation direction) are assumed to be zero; finally, the applied load P is assumed to be distributed over the entire length m of the anchoring head.

Beam theory allows us to determine the expression for the deflection w of each half of the test piece in the mean loading axis:

$$w=P(a-m/2)^3(1+0.5(m/(4(a-m/2)))^3)/3EI \quad (2)$$

with:

a: total length of the crack m: length of the anchoring heads

I: bending moment of inertia of the beam→I=bh³/12 h: total thickness of the beam b: width of the test piece

P: load applied

E: Young's modulus of the sheet of the steel blanks of the test piece.

From this, the expression for the compliance C of the overall test piece (C=2w/P) is deduced; from this expression, the derivative with respect to a, dC/da, is then calculated; next, the result is incorporated into equation (1), thus obtaining:

$$G_{Ic}=12P^{A2}(a-m/2)^2/Eb^2h^3 \quad (3)$$

With:

m: length of the anchoring heads: 0.003 m h: thickness of the steel sheet: 0.004 m b: width of the test piece: 0.025 m $P_A$(in N): force corresponding to the point of intersection between that part of the curve associated with unloading and that part of the curve associated with loading: points A1 to A8 in FIG. 7 a: total crack length (in m)=initial length $a_o$+measured propagation length for the force $P_A$ of the said point of intersection.

For each test piece, the value of $G_{Ic}$ for each curve intersection point A (cf. FIG. 7: points A1 to A8), that is to say for each unloading-loading cycle of the test, is evaluated; as final value of $G_{Ic}$ characterizing the bonding system, the arithmetic mean of these values obtained is taken; the standard deviation corresponding to this mean is calculated; next, the crack propagation fracture surface is examined, that is to say the fracture surface of the test piece at the adhesively bonded joint.

2) Description of the Method Used for Evaluating the Critical Energy Release Rate in Mode II, Denoted $G_{IIc}$, of a Bonding System From Shear Tests on an ENF Test Piece in Mode II (Shear):

ENF is the abbreviation for "End Notch Flexure".

2.1/Principle of the Test:

The test employed consists in making a crack propagate within an adhesively bonded joint stressed in shear and in measuring the resistance of this joint to the propagation of this crack.

2.2/Geometry and Dimensions of the Test Piece Tested:

The ENF test pieces used (cf. FIG. 8) are virtually identical to those used for the test intended for calculating $G_{Ic}$, except for the following differences:

total length: 200 mm initial crack length: $a'_o$=47.5 mm.

The properties of the steel blanks are identical to those of the composite sheets of the previous test, for the same reasons already mentioned.

Figure 8:
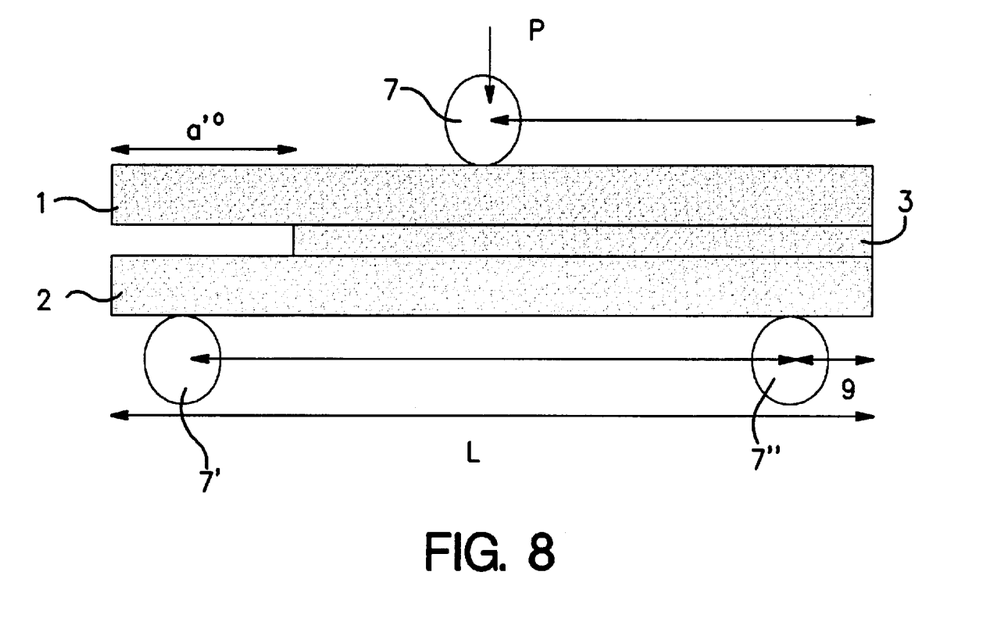
FIG. 8 shows the test piece to be tested and the set-up which are used.

As shown in FIG. 8, the ENF test piece is tested on a conventional "three-point bending" rig having three bearing rolls: an upper roll 7 positioned in the middle of the test piece and two lower rolls 7' and 7" positioned at each end.

2.3/Execution of the Test:

The curve giving the change in the load P as a function of the displacement D of the crossbeam of the tensile testing machine working in compression, as indicated by the central arrow in FIG. 8, is recorded.

After having positioned the test piece on the "three-point bending" rig, a vertical displacement is imposed at a constant rate (equal to 1.25 mm/min) of the upper roll 7 until crack propagation is initiated; as soon as this propagation starts, the measured load decreases.

Figure 9:
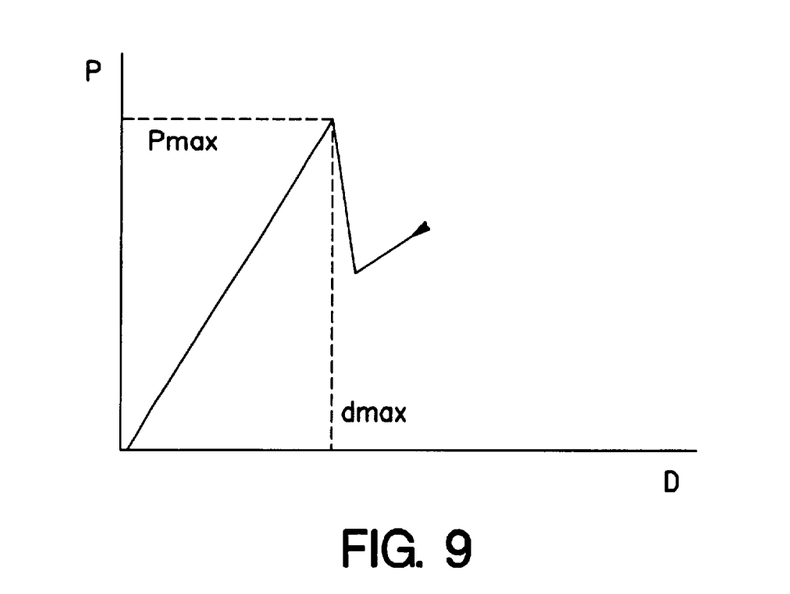
FIG. 9 illustrates diagrammatically the results obtained: load P as a function of the vertical displacement D.

For a large number of adhesives, as the curve in FIG. 9 illustrates, it is found that this propagation is very rapid (almost instantaneous); it is therefore generally not possible to carry out an "unloading-loading" series as previously.

For each test piece, the "load-displacement" curve (cf. FIG. 9) is recorded; the maximum load (denoted $P_{max}$) and the associated crossbeam displacement (denoted $d_{max}$), corresponding to the start of crack propagation, are recorded.

2.4/Exploitation of the Results

Within the context of this test, the critical energy release rate is determined by using a theoretical method based on beam theory.

The theoretical expression for the critical energy release rate $G_{IIc}$ is given by the equation (1):

$$G_{IIc}=(P^2/2b)(dC/da) \quad (4)$$

with P: applied load b: width of the test piece dC/da: derivative of the compliance with respect to the crack length.

Using beam theory, we are able to determine the expression for the elastic compliance C of the test piece:

$$C=(2L^3+3a^3)/(8Ebh^3) \quad (5)$$

with:

L: half-distance between supports (L=75 mm)

a: crack length corresponding to $a_o$+propagation length h: total thickness of the beam b: width of the test piece E: Young's modulus.

By calculating dC/da from equation (5) and then transferring the result into equation (4), the following equation of the critical energy release rate $G_{IIc}$ of the bonding system tested is obtained:

$$G_{IIc}=9a_o^2P_{max}d_{max}/(2b(2L^3+3a_o^3)) \quad (6)$$

with:

$a_o$: initial crack length (in m) measured between the two lower bearing rolls 7' and 7"; since these rolls are a distance of q=25 mm from the end of the test piece, $a_o=a'_o-q=47.5$ mm−25 mm=22.5 mm=0.0225 m b: width of the test piece=0.025 m $P_{max}$ (in N): maximum load recorded during the start of propagation $d_{max}$ (in m): displacement of the crossbeam associated with $P_{max}$.

For each test piece, the value of $G_{IIc}$ is thus evaluated and after the test the fracture surface is examined.

3) Description of the Method Used to Evaluate the Levels of Adhesion, Ductility and Toughness of a Bonding System;

3.1/Geometry of the Test Pieces:

The composite sheet test pieces used are shown in FIG. 1.

Each test piece comprises a main blank 1, having a length of 200 mm and a thickness of 0.8 mm, reinforced over half its length by a patch blank 2, having a length of 100 mm and the same thickness; the bond between the patch blank 2 and the main blank is provided by the bonding system 3 to be tested and the width of the test piece is 25 mm.

Steel sheets of various types are used.

3.2/Execution of the Test:

For the test, the thickest end of this test piece is anchored in a fixed jaw while a displacement is imposed on the opposite end by pulling in the plane of the sheet; the rate of displacement imposed is equal to 5 mm/min.

This test makes it possible to reproduce the main stresses undergone by the bonding systems during the operations of forming composite sheets or "adhesively bonded blanks", especially during the drawing operations; thus it makes it possible to determine whether the adhesion and ductility levels of a given bonding system applied to a given steel sheet are sufficient to withstand the plastic deformations imposed on the steel blanks during drawing; it also makes it possible to qualitatively determine the resistance of the bonding system to the shear and peel stresses generated at the geometrical singularity (region 6) and, in this regard, to determine the toughness of the bonding system.

During the displacement and the tensile test, the curve giving the change in load as a function of the displacement of the crossbeam of the tensile testing machine is recorded; the load (denoted $F_d$) is determined, from which the start of failure of the adhesively bonded joint is observed or, where appropriate, the load corresponding to failure of the test piece by the necking of the longer main blank 1 is noted.

If the test piece fails by delamination of the adhesively bonded joint 3, the failure zone of the test piece is noted:

failure in the middle of the adhesively bonded joint: cohesive failure;

failure in the adhesively bonded joint near the steel sheet: superficial cohesive failure;

failure at the "adhesive/blank" interface: adhesive failure;

failure in the steel cover: failure by cover pull-out.

3.3/Exploitation of the Results:

If failure of the test piece is observed to be by the necking of the steel blank 1 without prior failure of the adhesively bonded joint 3, the bonding system may be regarded as being sufficiently effective for forming drawable composite sheets.

on the other hand, if the onset of failure of the adhesively bonded joint is observed before the appearance of necking in this blank 1, the bonding system used may be considered as unsuitable for forming drawable composite sheets.

4) Description of the Standard Drawing Test Used to Verify That Drawability is Guaranteed When the Criteria Relating to the Adhesion and Ductility and to $G_{Ic}$ and $G_{IIc}$ are Met:

4.1/Principle of the Test:

The test employed consists in drawing a composite sheet test piece of circular shape in order to give it the shape of a flat-bottomed dish and in determining the maximum depth of penetration of the drawing punch above which failure of the test piece would occur.

Figure 10A:
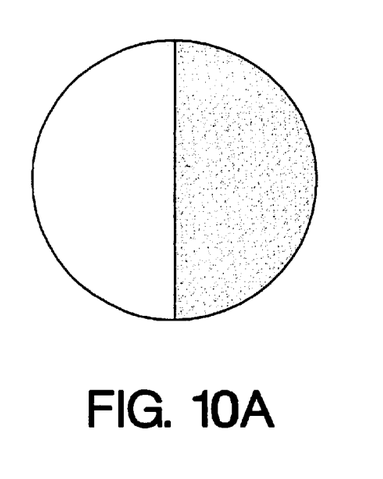
FIGS. 10A and 10B show the test piece to be tested.
Figure 10B:
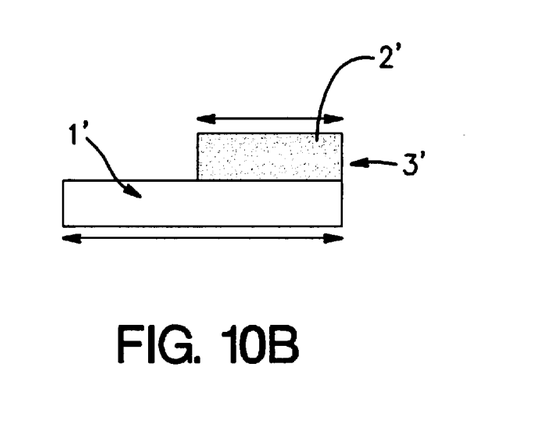

4.2/Geometry and Dimensions of the Test Piece Tested:

The test piece tested to characterize the drawability of adhesively bonded blanks is shown in a top view in FIG. 10A and in cross section in FIG. 10B.

The test piece has an outside diameter of 130 mm; it is formed by a main blank 1' of the same diameter, with a thickness of 0.8 mm, reinforced over half its area by a 0.6 mm thick blank 2' adhesively bonded to the main blank 1' by the bonding system 3' to be tested.

Figure 11:
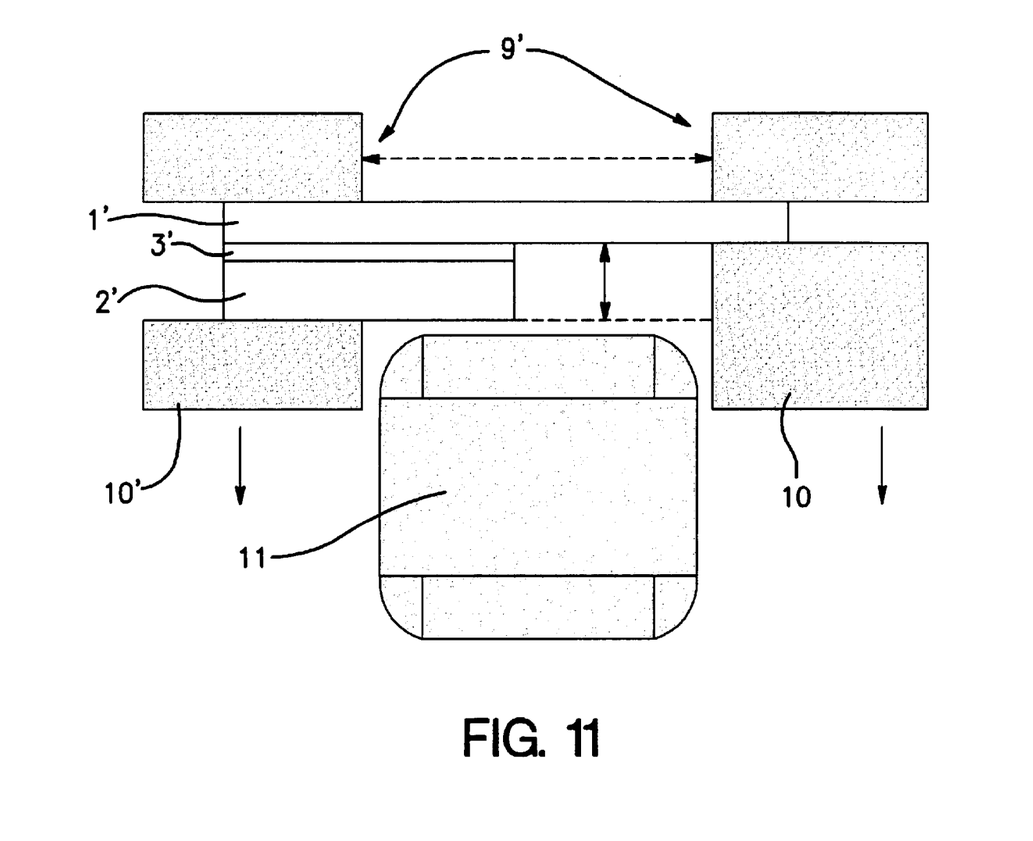
FIG. 11 shows the set-up used for the drawing trial.

4.3/Execution of the Test:

The drawing tests are carried out on an industrial-scale press having a power of 0.8 meganewtons according to a set-up shown in schematic cross section in FIG. 11.

The drawing machine comprises a drawing die 9, a drawing punch 11 and a set of blank holders 10, 10' matched to the geometry of the test piece and designed to grip it during the drawing operation.

The inside diameter of the drawing die 9 is 64 mm; the punch 11 has an outside diameter of 60 mm and a radius of curvature of 7 mm.

For the drawing operation, the drawing punch 11 is stationary while the die/blank-holder assembly moves.

A series of tests makes it possible to determine the maximum depth of penetration of the punch in order not to fracture the test piece; the greater this maximum drawing depth, the better the drawability of the composite sheet test piece.

For each specimen, the load applied by the blank holder 10, 10' to the test piece was optimized before seeking to determine the maximum drawing depth.

RESULTS

1) Mean Values of $G_{Ic}$ and $G_{IIc}$ for the Various Bonding Systems:

Using the methods described above (§METHODS §1 and §2), the mean values of the critical energy release rates in mode I ($G_{Ic}$) and in mode II ($G_{IIc}$) of the various bonding systems described above (§MATERIALS) are determined by testing 3 to 5 test pieces for each bonding system.

The values obtained are given in Table I together with the standard deviation σ.

In the case of bonding systems 4, 5 and 7, it was not possible to determine the values of $G_{Ic}$ and $G_{IIc}$ accurately; likewise in the case of bonding system 6, it was not possible to determine the value of $G_{IIc}$; this is because the steel blanks of the composite sheet test pieces produced using these bonding systems plastically deform before the adhesively bonded joints of these test pieces break; minimum values of $G_{Ic}$ and $G_{IIc}$ were therefore assigned to these bonding systems, the values being calculated by taking as reference the load from which the steel sheets plastically deform.

TABLE I

Values of the critical energy release rates

| Critical energy release rate: No of the bonding system | $G_{Ic}$ J/m$^2$ | σ | $G_{IIc}$ J/m$^2$ | σ |
|---|---|---|---|---|
| 1: one-component epoxy base | 250 | 60 | 360 | 100 |
| 2: polystyrene base | 300 | 50 | 450 | 70 |
| 3: PMMA base | 250 | 55 | 500 | 80 |
| 4: polypropylene base | >3800 | — | >2700 | — |
| 5: polyethylene base | >3800 | — | >2600 | — |
| 6: epoxy/mesh film base | 3080 | 150 | >2000 | — |
| 7: PVC base | >3800 | — | >2700 | — |

2) Determination of the Elongation at Break in Tension of the Various Bonding Systems:

For the bonding systems consisting of a thermoplastic core (bonding systems 2 to 5 and system 7), tensile tests were carried out on free films having dimensions of 20 mm×150 mm produced from these systems or, where appropriate, from the core of these systems, so as to determine the elongation at break of these systems; for these tensile tests, the initial distance between the jaws is about 100 mm and the strain rate applied is between 0.001 s$^{-1}$ and 0.1 s$^{-1}$.

For both bonding systems 1 and 6, the indicated elongation values are obtained from tensile tests on dumbbell test pieces of solid adhesive.

The values of the elongation at break thus determined are given in Table II below.

TABLE II

Elongation at break of the bonding systems

| No of the bonding system | Elongation at break in tension (in %) |
|---|---|
| 1: one-component epoxy base | 0.5% |
| 2: polystyrene base | 2% |
| 3: PMMA base | 5% |
| 4: polypropylene base | >500% |
| 5: polyethylene base | >500% |
| 6: epoxy/mesh film base | 20% |
| 7: PVC base | 280% |

3) Evaluation of the Adhesion, Ductility and Toughness Levels of a Bonding System for a Composite Sheet:

This evaluation is carried out using the method explained in §METHODS §3; to use this method, composite sheet test pieces are prepared by using, for the blanks, galvanized steel sheets (coating thickness about 10 μm per side) having the properties given in Table III below.

TABLE III

Properties of the steel sheets used for the test pieces

| Steel sheet | Thickness | Yield stress $R_{p0.2\%}$ | Tensile strength $R_m$ | Distributed elongation (1) | Elongation at break (2) |
|---|---|---|---|---|---|
| ES | 0.8 mm | 155 Mpa | 300 Mpa | 23.5% | ≈40% |
| SOLPHOR ™ | 0.8 mm | 260 Mpa | 390 Mpa | 19.5% | ≈30% |
| SOLDUR ™ | 0.8 mm | 370 MPa | 430 Mpa | 16.5% | ≈20% |

(1) corresponding to the tensile strength Rm
(2) indicative values

The above test (§METHODS §3) is used to reproduce the principal stresses that composite sheets would have to withstand during various forming operations and more particularly drawing operations.

The results obtained for each test piece therefore relate to the performance of a pair (steel sheet/bonding system) of a given composite sheet.

For each type of composite sheet comprising a bonding system and a type of steel sheet, the mean load (denoted $F_d$) during the onset of failure is measured; the failure mode (denoted FM) is observed and then determined; for each type of composite sheet, between 3 and 5 test pieces are tested; the results obtained are given in Table IV.

TABLE IV adhesion of the various bonding systems to various steels

| Bonding system | Obs. | ES steel sheet | SOLPHOR ™ steel sheet | SOLDUR ™ steel sheet |
|---|---|---|---|---|
| 1 One-component epoxy | $F_d$ FM | 4600 N | 6100 N | 7750 N |
| | | Failure by delamination within the adhesively bonded joint (failure in the adhesive) | | |
| 2 Polystyrene base | $F_d$ FM | 4670 N | 6200 N | 7700 N |
| | | Failure by delamination within the bonding system (failure in the polystyrene core) | | |
| 3 PMMA base | $F_d$ FM | 4550 N | 6150 N | 7800 N |
| | | Failure by delamination within the adhesively bonded joint (failure in the PMMA core) | | |
| 4 polypropylene base | $F_d$ FM | 5500 N | 7000 N | 8500 N |
| | | Failure by necking of the steel | | |
| 5 polyethylene base | $F_d$ FM | 5450 N | 7050 N | 8450 N |
| | | Failure by necking of the steel | | |
| 6 aeronautical epoxy film base | $F_d$ FM | Not tested Not tested | 6725 N Hybrid failure: mainly by delamination within the adhesively bonded joint with onset of necking of the steel | 8000 N Hybrid failure: mainly by necking of the steel with onset of delamination within the bonding system |
| 7 PVC base | $F_d$ FM | 5450 N | 7025 N | 8450 N |
| | | Failure by necking of the steel | | |

4) Comparison of the Intrinsic Properties of the Bonding System With the Performance of the Composite Sheets in Terms of Mean Load ($F_d$) at the Onset of Failure and of Failure Mode (F):

Definition of the bonding systems according to the invention

The results given in Table IV at least partly illustrate the invention according to which the bonding system of the composite sheets must, in order for them to be drawable without deterioration, have at least the following general properties:

$G_{Ic}$ values greater than 1500 J/m²; and $G_{IIc}$ values greater than 2000 J/m².

Bonding systems 4 to 7 meet these criteria according to the invention.

When these criteria relating to the bonding system are met (cf. Table I), the results given in Table IV relating to the mean load (denoted $F_d$) at the onset of failure and the failure mode (denoted FM) show that the composite sheets produced from these bonding systems are drawable whatever the type of sheet used (ES, SOLPHOR™ and SOLDUR™) for the adhesively bonded blanks of these composite sheets.

An additional characteristic of the bonding system relates to the conventional criterion of elongation at break which must be at least equal to that of the metal of the adhesively bonded blanks of the composite sheet.

Among the bonding systems meeting the above criteria, it has been found (cf. Tables II and IV) that bonding system 6 barely meets this additional criterion when combined with the SOLDUR™ steel and does not meet it at all when combined with the SOLPHOR™ steel.

Further Comments

Whatever the type of sheet used, delamination of the adhesively bonded joint is observed in the case of test pieces produced with systems 1, 2 and 3, which delamination takes place just after the steel sheets undergo plastic deformation; this delamination is not due to poor adhesion, as the observed fracture surfaces bear witness, namely cohesive failures within the bonding system; this delamination is the manifestation of the fact that these systems have elongation at break values and $G_{Ic}$ and $G_{IIc}$ values which are too low.

On the other hand, whatever the type of sheet used, no delamination of the adhesively bonded joint is observed in the case of test pieces produced from bonding systems 4, 5 and 7; with these bonding systems, which meet the criteria according to the invention, the test pieces fail by the necking of the steel sheets at low load values greater than the load values observed at the onset of delamination of the test pieces adhesively bonded using systems 1, 2 and 3.

The results obtained using system 6 (epoxy/mesh film base) show that minimal $G_{Ic}$ and $G_{IIc}$ values do not constitute a combination of criteria sufficient to guarantee that the bonding system can withstand the mechanical stresses imposed during the drawing operations; for both types of sheet used, the values of the load at failure of the test pieces are less than those of bonding systems 4, 5 and 7; furthermore, on the composite sheets produced using this system 6, a hybrid failure mode is observed, namely failure by necking of the steel and failure by delamination of the bonding system; this delamination is very substantial in the case of SOLPHOR™ sheets, being due to the fact that the intrinsic ductility of the bonding system is not sufficient for accompanying the plastic deformation of the steel sheets used.

5) Evaluation of the Drawing Results for Various Composite Sheets Based on Different Bonding Systems:

This evaluation is carried out using the method explained in §METHODS §4; for the purpose of employing this method, using the seven bonding systems 3' defined above (§MATERIALS), two types of test pieces are prepared which differ by the sheets used for the main blank 1' and by the sheets used for the patch blank 2' (cf. FIGS. 10A and 10B); the two configurations studied are indicated in Table V.

TABLE V

| Types of composite sheets tested in drawing | | |
|---|---|---|
| Configuration | Main blank | Patch |
| 1 | ES sheet, thickness: 0.8 mm | ES sheet, thickness: 0.6 mm |
| 2 | ES sheet, thickness: 0.8 mm | SOLDUR sheet, thickness: 0.6 mm |

Table VI below gives the mean values of the maximum drawing depths measured for the two configurations ("Config.") and the seven composite sheet bonding systems; each mean value was determined from tests carried out on 3 to 5 test pieces.

6) Comparison of the Intrinsic Properties of the Bonding System and the Performance of the Composite Sheets in Terms of Drawability Evaluated From the Maximum Drawing Depth:

Confirmation of the Definition of the Bonding Systems According to the Invention The results given in Table VI below show that the composite sheets produced using bonding systems 4, 5 and 7 exhibit, whatever the configuration:

good drawability, namely a maximum drawing depth of at least 20 mm, this being equivalent for the three systems;

the same failure mode and the same point of failure when the drawing depth imposed exceeds the maximum drawing depth value: failure by necking of the metal in the thinner sheet and localization of the fracture initiation near the patch.

No delamination of the bonding systems is observed.

Conversely, the results show that the composite sheets produced using bonding systems 1, 2 and 3, whatever the configuration, exhibit poor drawability: at most a maximum drawing depth of 15 mm. The maximum drawing values obtained with these bonding systems 1, 2 and 3 are limited by the appearance of appreciable (and unacceptable) delamination of the adhesively bonded patches when these maximum drawing depth values are exceeded.

The composite sheets produced from bonding system 6 do not exhibit very satisfactory drawability, whatever the configuration (1 or 2); this is because:

even though the maximum drawing depth value is very close to (although less than) that of the satisfactory systems 4, 5 and 7, and although, as for these systems, failure of the test pieces by necking of the steel in the thinner blank is indeed observed when the imposed drawing depth exceeds the maximum drawing depth value, nevertheless, significant delamination of the adhesively bonded patch blanks is observed at the bottom of the dishes for both configurations; these delaminations are due to the fact that the ductility of the bonding system used is not sufficient compared with that of the ES steel in order to withstand the substantial plastic deformation of the steel at the bottom of the dish. These delaminations are unacceptable for in-service behaviour of such drawn composite sheets; they encourage water to diffuse into and be retained within the bonding systems and thus degrade the durability and corrosion resistance of the adhesively bonded blanks; such delaminations also degrade the fatigue behaviour of the parts formed.

In general, the drawing tests show that, according to the invention, bonding systems having a $G_{Ic}$ value greater than 1500 J/m², a $G_{IIc}$ value greater than 2000 J/m² and an elongation at break value greater than that of the metal of the composite sheet make it possible to produce composite sheets having a very good drawability; other tests have shown that, under the conditions of the invention, the drawability was comparable to that of sheets obtained by milling and laser welding of blanks of different thicknesses.

TABLE VI

Drawing results

| Composite sheet tested | | Maximum drawing depth (mm) | Observations about the failure mode (if drawing depth > max. |
|---|---|---|---|
| Config. | Bonding system | | |
| 1 | 1 one-component epoxy | 14 | Failure by delamination of the patch |
| | 2 - polystyrene | 14 | Failure by delamination of the patch |
| | 3 - PMMA | 15 | Failure by delamination of the patch |
| | 4 - polypropylene | 21 | Failure by necking the steel; no delamination |
| | 5 - polyethylene base | 21 | Failure by necking of the steel; no delamination of the patch |
| | 6 - epoxy/mesh film | 19 | Failure by necking of the steel; delamination of the patch at the bottom of the dish (region where high levels of expansion deformation of the steel) |
| | 7 - PVC base | 20 | Failure by necking of the steel; no delamination of the patch |
| 2 | 1 one-component epoxy | 13 | Failure by delamination of the patch |
| | 2 - polystyrene | 14 | Failure by delamination of the patch |
| | 3 - PMMA base | 14 | Failure by delamination of the patch |
| | 4 - polypropylene base | 21 | Failure by necking of the steel; no delamination of the patch |
| | 5 - polyethylene | 21 | Failure by necking of the steel; no delamination of the patch |
| | 6 - epoxy/mesh film | 19 | Failure by necking of the steel; delamination of the patch at the bottom of the dish (region where high levels of expansion deformation of the steel) |
| | 7 - PVC base | 20 | Failure by necking of the steel; no delamination of the patch |

What is claimed is:

1. A composite sheet having thickness variations and intended to be drawn, the sheet comprising at least one main metal sheet and at least one patching metal sheet blank adhesively bonded as a patch to a region of said main sheet by a bonding system having a critical energy release rate in mode I (tension) greater than 1500 J/m², a critical energy release rate in mode II (shear) greater than 2000 J/m², an elongation at break greater than that of said main sheet and said patch blank and an elongation at break of greater than 40%.

2. The sheet according to claim 1, wherein said bonding system comprises at least one of a thermoplastic resin, a thermosetting resin and an elastomeric resin.

3. The sheet according to claim 1, wherein the thickness of said bonding system is between 0.05 and 5 mm.

4. The sheet according to claim 1, wherein said bonding system comprises a polymer material selected from the group consisting of polyolefins and polyvinyl chlorides.

5. The sheet according to claim 1, wherein said bonding system comprises a polyolefin polymer material having a melting point greater than 120° C.

6. The sheet according to claim 1, wherein said bonding system comprises a polyolefin polymer material having a melting point greater than 160° C.

7. The sheet according to claim 1, wherein said bonding system comprises a core of a polymer material and two thin layers of adhesive, one layer between said main sheet and one face of the core, and other layer between said patching sheet and the other face of the core.

8. The sheet according to claim 7, wherein the thickness of each of said thin layers is between 5 and 50 µm.

9. A process for manufacturing the composite sheet according to claim 1, the process comprising the steps of:
preparing the mans metal sheet and the at least one patching metal sheet blank;
inserting the bonding system between said patch blank and a region of said main sheet to be reinforced; and
optionally, cross linking said bonding system to obtain said composite sheet.

10. A drawn composite sheet having thickness variations and comprising at least one main metal sheet and at least one patching metal sheet blank adhesively bonded as a patch to a region of said main sheet by a bonding system having a critical energy release rate in mode I (tension) greater than 1500 J/m², a critical energy release rate in mode II (shear) greater than 2000 J/m², an elongation at break greater than that of said main sheet and said patch blank and an elongation at break of greater than 40%.

11. The sheet according to claim 10, wherein said bonding system comprises at least one of a thermoplastic resin, a thermosetting resin and an elastomeric resin.

12. The sheet according to claim 10, wherein the thickness of said bonding system is between 0.05 and 5 mm.

13. The sheet according to claim 10, wherein said bonding system comprises a polymer material selected from the group consisting of polyolefins and polyvinyl chlorides.

14. The sheet according to claim 10, wherein said bonding system comprises a polyolefin polymer material having a melting point greater than 120° C.

15. The sheet according to claim 10, wherein said bonding system comprises a polyolefin polymer material having a melting point greater than 160° C.

16. The sheet according to claim 10, wherein said bonding system comprises a core of a polymer material and two thin layers of adhesive, one layer between said main sheet and one face of the core, the other layer between said patching sheet and the other face of the core.

17. The sheet according to claim 16, wherein the thickness of each of said thin layers is between 5 and 50 µm.

18. A process for manufacturing the drawn composite sheet according to claim 10, the process comprising the steps of:

preparing the main metal sheet and the at least one metal patching sheet blank;

inserting the bonding system between said patch blank and a region of said main sheet to be reinforced;

optionally, cross linking said bonding system to obtain a composite sheet; and drawing said composite sheet.

* * * * *